(12) United States Patent
Turner et al.

(10) Patent No.: US 11,032,586 B2
(45) Date of Patent: Jun. 8, 2021

(54) TECHNIQUES FOR DYNAMIC DIGITAL ADVERTISING

(71) Applicant: WP Company LLC, Washington, DC (US)

(72) Inventors: Jeffrey Mark Turner, Arlington, VA (US); Amanda Hicks, Washington, DC (US); Matthew Philip Lemieux, Vienna, VA (US); Hongliang Eric Lin, Flushing, NY (US); Aram Jason Zucker-Scharff, Long Island City, NY (US); Christian Derrick Walls, Fairfax, VA (US); Brittany Pableo, Washington, DC (US)

(73) Assignee: WP COMPANY LLC, Washington, DC (US)

( * ) Notice: Subject to any disclaimer, the term of this patent is extended or adjusted under 35 U.S.C. 154(b) by 0 days.

(21) Appl. No.: 16/577,795

(22) Filed: Sep. 20, 2019

(65) Prior Publication Data

US 2020/0099967 A1 Mar. 26, 2020

Related U.S. Application Data

(60) Provisional application No. 62/734,734, filed on Sep. 21, 2018.

(51) Int. Cl.
*H04N 21/234* (2011.01)
*H04N 21/81* (2011.01)
(Continued)

(52) U.S. Cl.
CPC ... *H04N 21/23424* (2013.01); *H04N 21/4316* (2013.01); *H04N 21/4355* (2013.01); *H04N 21/6587* (2013.01); *H04N 21/812* (2013.01)

(58) Field of Classification Search
CPC ......... H04N 21/23424; H04N 21/4316; H04N 21/4355; H04N 21/6587; H04N 21/812;
(Continued)

(56) References Cited

U.S. PATENT DOCUMENTS

| 7,568,148 B1 | 7/2009 | Bharat et al. |
| 8,346,229 B2 | 1/2013 | Scott |

(Continued)

OTHER PUBLICATIONS

International Search Report and Written Opinion dated Nov. 25, 2019 received in related International Application No. PCT/US2019/052144 filed Sep. 20, 2019 (10 pages).

(Continued)

*Primary Examiner* — Alexander Gee
(74) *Attorney, Agent, or Firm* — Wilmer Cutler Pickering Hale and Dorr LLP

(57) ABSTRACT

Techniques for dynamic digital advertising are disclosed. In one particular embodiment, the techniques may be realized as a dynamic advertising method comprising: receiving, by a computer processor associated with a dynamic advertising device, from a client device, first advertising content information including timepoint data for a playback event associated with first advertising content of a first advertising slot on a webpage; configuring, by the computer processor, a recall request for the first advertising content, the recall request including identification data associated with the first advertising content and specifying a timepoint obtained from the timepoint data; receiving, by the computer processor, from the client device, first advertising content resume request; and requesting, by the computer processor, for the client device, using the recall request, timepoint-configured first advertising content having a playback start time equal to the timepoint.

20 Claims, 11 Drawing Sheets

(51) Int. Cl.

| | |
|---|---|
| *H04N 21/431* | (2011.01) |
| *H04N 21/435* | (2011.01) |
| *H04N 21/6587* | (2011.01) |
| *G06Q 30/02* | (2012.01) |
| *H04N 21/845* | (2011.01) |

(58) Field of Classification Search
CPC ............. H04N 21/4312; H04N 21/431; H04N 21/44016; H04N 21/4728; H04N 5/2723
See application file for complete search history.

(56) References Cited

U.S. PATENT DOCUMENTS

| | | | |
|---|---|---|---|
| 9,122,989 B1 | 9/2015 | Morris et al. | |
| 9,189,805 B2 | 11/2015 | Huang et al. | |
| 9,846,836 B2 | 12/2017 | Gao et al. | |
| 9,852,215 B1 | 12/2017 | Sullivan et al. | |
| 2007/0276732 A1 | 11/2007 | Lee et al. | |
| 2009/0319518 A1 | 12/2009 | Koudas et al. | |
| 2010/0118941 A1* | 5/2010 | Taylor .............. | H04N 21/23424 375/240.12 |
| 2010/0241597 A1 | 9/2010 | Chen et al. | |
| 2011/0302103 A1 | 12/2011 | Carmel et al. | |
| 2013/0305170 A1 | 11/2013 | de Souza et al. | |
| 2013/0311408 A1 | 11/2013 | Bagga et al. | |
| 2014/0019443 A1 | 1/2014 | Golshan | |
| 2014/0040277 A1 | 2/2014 | Asur et al. | |
| 2014/0095328 A1 | 4/2014 | Forouzandeh et al. | |
| 2014/0372229 A1* | 12/2014 | Huang ................ | G06Q 30/0277 705/14.68 |
| 2015/0082339 A1* | 3/2015 | Sumitomo ....... | H04N 21/42202 725/32 |
| 2015/0161517 A1 | 6/2015 | Bae et al. | |
| 2016/0034712 A1 | 2/2016 | Patton et al. | |
| 2016/0247203 A1* | 8/2016 | Yavonditte ......... | G06Q 30/0277 |
| 2016/0300141 A1 | 10/2016 | Veeraragavan et al. | |
| 2016/0321261 A1 | 11/2016 | Spasojevic et al. | |
| 2017/0140291 A1 | 5/2017 | Wu et al. | |
| 2017/0323210 A1 | 11/2017 | Wang et al. | |
| 2018/0082340 A1* | 3/2018 | Freund ............... | G06Q 30/0277 |

OTHER PUBLICATIONS

Bandari, R.; Asur, S.: and Huberman. B. A., "The Pulse of News in Social Media: Forecasting Popularity," Co RR abs/ 1202.0332, 2012 (8 pages).
Berger, J., and Milkman, K., "Social Transmission, Emotion, and the Virality of Online Content," Wharton Research Paper, 2010 (1 page).
Berger, J. and Milkman, K. L., "What Makes Online Content Viral?" Journal of Marketing Research, 49(2):192-205, 2011 (17 pages).
Berger, J., and Schwartz, E. M., "What Drives Immediate and Ongoing Word of Mouth?" Journal of Marketing Research, 48(5):869-880, 2011 (12 pages).
Berger, J., "Arousal Increases Social Transmission of Information," Journal of Psychological Science, 22(7):891-893, 2011 (3 pages).
Borghol, Y.; Ardon, S.; Carlsson, N.; Eager, D.: and Mahanti, A., "The Untold Story of the Clones: Content-Agnostic Factors that Impact YouTube Video Popularity," In Proceedings of the SIGKDD' 12, 1186-1194, 2012 (9 pages).
Castillo, C.; El-Haddad, M.; Pfeffer, J.; and Stempeck, M., "Characterizing the life cycle of online news stories using social media reactions," In Proceedings of the CSCW14, 211-223, 2013 (12 pages).
Cha, M.; Kwak, H.; Rodriguez, P.; Ahn, Y.-Y.; and Moon, S., "Analyzing the Video Popularity Characteristics of Large-Scale User Generated Content Systems," IEEE/ ACM Transactions on Networking (TON) 17(5):1357-1370, 2009 (14 pages).
Cherkasova, L., and Gupta, M., "Analysis of enterprise media server workloads: access patterns, locality, content evolution, and rates of change," IEEE/ ACM Transactions on Networking, 12(5):781-794, 2004 (19 pages).
DuBay, "The Principles of Readability," Online Submission (2004) (75 pages).
Freedman, D. "Statistical Models: Theory and Practice," Cambridge University Press, 2009 (11 pages).
Gürsun, G. et al., "Describing and forecasting video access patterns," In *Proceedings of IEEE INFOCOM'11*, 16-20, 2011 (9 pages).
Hutto, C. J., and Gilbert, E. "Vader: A parsimonious rule-based model for sentiment analysis of social media text," In Proceedings of the ICWSM' 14, 2014 (10 pages).
Kong, Shoubin, Ye, Fei, and Feng, Ling, "Predicting future retweet counts in a microblog," Journal of Computational Information Systems 10(4):1393-1404, 2014 (12 pages).
Kwak, H.; Lee, C.; Park, H.; and Moon. S., "What is twitter, a social network or a news media?" In Proceedings of the WWW'10, 591-600, 2010 (10 pages).
Lee, J. G.; Moon, S.; and Salamatian, K., "Modeling and predicting the popularity of online contents with cox proportional hazard regression model," Journal of Neurocomputing 76(1):134-145, 2012 (12 pages).
Lerman, K., and Hogg, T., "Using a model of social dynamics to predict popularity of news," In Proceedings of WWW'10, 621-630, 2010 (10 pages).
Marujo, L.; Bugalho, M.; Neto, J. P. d. S.; Gershman. A.; and Carbonell, J., "Hourly traffic prediction of news stories," CARS'11, Oct. 23, 2011, Chicago, Illinois, USA (5 pages).
Mishne, G., and De Rijke, M., "A study of blog search," In Advances in information retrieval, Springer. 289-301, 2006 (13 pages).
Pinto, H.; Almeida, J. M.; and Goncalves, M. A., "Using early view patterns to predict the popularity of YouTube videos," In Proceedings of the WSDM' 13, 365--374, 2013 (10 pages).
Reis, J., Benevenuto, F., Vaz de Melo, P., Prates, R., Kwak, H., and An, J., "Breaking the News: First Impressions Matter on Online News," arXiv preprint arXiv:1503.07921, 2015 (10 pages).
Szabo, G., and Huberman, B. A., "Predicting the popularity of online content," Communications of the ACM 53(8):80--88, 2010 (9 pages).
Tatar, A. et al., "A Survey on Predicting the Popularity of web content," Journal of Internet Services and Applications, 5(1):1-20, 2014 (20 pages).
Tatar, A., et al., "Ranking news articles based on popularity prediction," In Proceedings of ASONAM'12, 106-110, 2012 (5 pages).
Tsagkias, et al., "Predicting the volume of comments on online news stories," In Proceedings of the CIKM'09, 1765-1768, 2009 (4 pages).
Zaman, T. et al., "A bayesian approach for predicting the popularity of tweets," The Annals of Applied Statistics, 8(3):1583-1611, 2014 (31 pages).
Zhao, Q.; Erdogdu, M. A.; He, H. Y.; Rajaraman, A.; and Leskovec, J., "Seismic: A self-exciting point process model for predicting tweet popularity," CoRR abs/1506.02594, 2015 (10 pages).

\* cited by examiner

TECHNIQUES FOR DYNAMIC DIGITAL ADVERTISING

CROSS-REFERENCE TO RELATED APPLICATIONS

This patent application claims priority to U.S. Provisional Patent Application No. 62/734,734, filed Sep. 21, 2018, which is hereby incorporated by reference herein in its entirety.

FIELD OF THE DISCLOSURE

The present disclosure generally relates to data processing, and more particularly, to data processing with respect to digital media and advertising.

BACKGROUND OF THE DISCLOSURE

Digital media, such as digital video content, may be placed on a webpage for viewing by a webpage visitor. Advertising systems may provide digital advertising, such as video advertisements, to the webpage so that these advertisements play "pre-roll" (e.g., before) the digital video content is viewable by the visitor. Such systems, however, may not be desirable. For example, the visitor may not want to watch an advertisement before the video content and may be frustrated by such systems due to the time that must be spent watching the advertisement. The visitor may decide not to watch the advertisement or the video content all. Indeed, the visitor may feel that the video content isn't worth the time spent watching the advertisement that must be viewed beforehand.

In another example, advertising systems may provide video advertisements to a webpage so that these advertisements play before video content is viewable, but may also provide a "skip" button or the like that allows a viewer to skip past the advertisement after a certain period of time and view the video content. However, these systems often require that viewers watch the same part of the advertisement repeatedly for different video content, which can bore a viewer. Advertisers may also be constrained by these systems because advertisement completion goals, which are metrics recording the number of video advertisements that are viewed in their entirety, may not be met. Viewers may therefore skip advertisements without viewing them in their entirety.

Thus, a need may exist for techniques that provide dynamic digital advertising content.

SUMMARY OF THE DISCLOSURE

Techniques for dynamic digital advertising are disclosed. In one particular embodiment, the techniques may be realized as a dynamic advertising method comprising: receiving, by a computer processor associated with a dynamic advertising device, from a client device, first advertising content information including timepoint data for a playback event associated with first advertising content of a first advertising slot on a webpage; configuring, by the computer processor, a recall request for the first advertising content, the recall request including identification data associated with the first advertising content and specifying a timepoint obtained from the timepoint data; receiving, by the computer processor, from the client device, first advertising content resume request; and requesting, by the computer processor, for the client device, using the recall request, timepoint-configured first advertising content having a playback start time equal to the timepoint.

In accordance with other aspects of this particular embodiment, the timepoint-configured first advertising content may be requested for the first advertising slot of the webpage.

In accordance with other aspects of this particular embodiment, the timepoint-configured first advertising content may be requested for a second advertising slot of the webpage, the second advertising slot being different from the first advertising slot.

In accordance with other aspects of this particular embodiment, the dynamic advertising method may further comprise: determining, by the computer processor, that a view window of the webpage does not include the first advertising slot; and determining, by the computer processor, that the view window of the webpage includes a second advertising slot different from the first advertising slot. The timepoint-configured first advertising content may be requested for the second advertising slot.

In accordance with other aspects of this particular embodiment, the dynamic advertising method may further comprise receiving, by the computer processor, from the client device, updated first advertising content information including second timepoint data including a second timepoint reflecting a second playback event, the second playback event being a determination that a view window of the webpage does not include the first advertising slot.

In accordance with other aspects of this particular embodiment, the dynamic advertising method may further comprise configuring, by the computer processor, a second recall request for the first advertising content, the second recall request including the identification data associated with the first advertising content and specifying the second timepoint.

In accordance with other aspects of this particular embodiment, the dynamic advertising method may further comprise requesting, by the computer processor, for the client device, second timepoint-configured first advertising content for a second advertising slot of the webpage. The second timepoint-configured first advertising content may have a playback start time equal to the second timepoint, and the second advertising slot may be located in the view window of the webpage that does not include the first advertising slot.

In accordance with other aspects of this particular embodiment, the dynamic advertising method may further comprise disabling, by the computer processor, serving of second advertising content to the webpage.

In accordance with other aspects of this particular embodiment, the dynamic advertising method may further comprise: determining, by the computer processor, a playback end of the first advertising content; updating, by the computer processor, a status associated with the first advertising content; and un-disabling, by the computer processor, serving of the second advertising content to the webpage.

In accordance with other aspects of this particular embodiment, the playback event may be an interaction with an icon of a user interface associated with the first advertising slot.

In another particular embodiment, the techniques may be realized as a dynamic advertising device comprising a computer processor and a memory storing instructions that, when executed by the computer processor, cause the computer processor to perform the steps in the above-described method.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Embodiments of the present disclosure may relate to systems and methods that provide dynamic digital advertising content. For example, when a visitor navigates to a web page featuring video content, advertisement content such as a video advertisement or an image advertisement, for example, may start playing in a first advertisement slot before video content. An interactive element, such as an icon, button, or the like, may be associated with the advertisement content. By interacting with the interactive element, the advertisement content may cease playing at a first time point and the video content may begin. A visitor may then watch the video content. The advertisement content may thereafter resume playback from the first time point.

As the visitor scrolls or otherwise navigates to different parts of the webpage such that the first advertisement slot is removed from the visitor's web browser view, the advertisement content may again cease playback at a second time point. When a user navigates to part of the webpage having a second advertisement slot within the visitor's web browser view, away from the first advertisement slot, the advertisement content may resume playing from the second time point in the second advertisement slot. This process may continue as the user scrolls to other parts of the webpage that have one or more advertisement slots, or returns to parts already viewed that have one or more advertisement slots. Once the advertisement content playback terminates, other advertisement content may render in one or more viewable advertisement slots.

Figure 1:
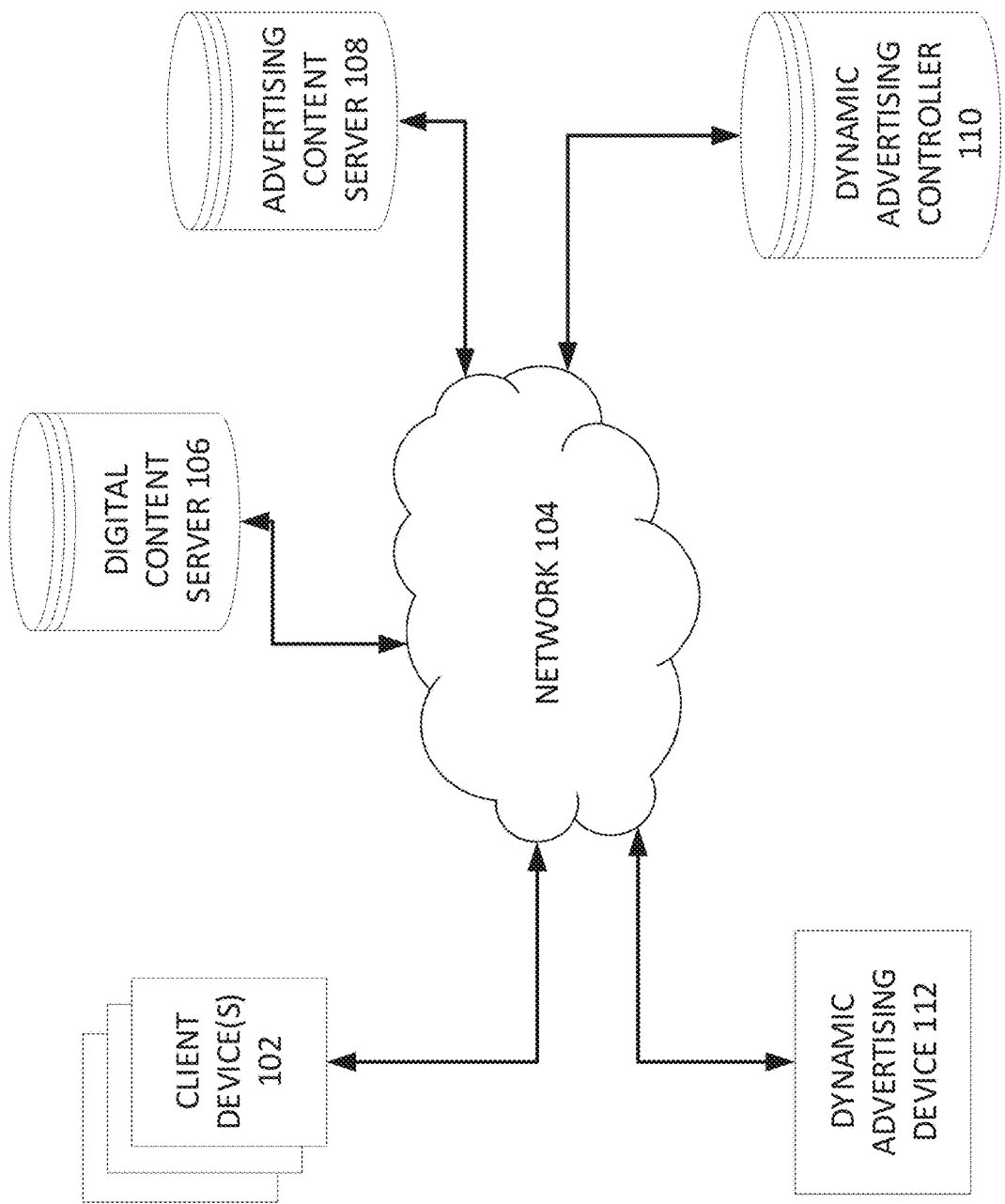
FIG. 1 shows an exemplary system in accordance with embodiments of the present disclosure.

FIG. 1 shows an exemplary system 100 in accordance with embodiments of the present disclosure. System 100 may include one or more client devices, such as client device 102. Client device 102 may be a computing device such as personal computer, laptop computer, server, cellular phone, tablet computer, and the like. Client device 102 may be a computing device that accesses digital media, such as one or more Internet website pages. Client device 102 may access digital media via a browser, such as a web browser. The web browser may be a standalone application that is present on client device 102, or may be a platform within another application, such as a social media application. For example, the social media application may be Facebook, Twitter, or Instagram, for example.

System 100 may also include network 104. Network 104 may facilitate the transmission and reception of data between different elements that are connected to it. In some embodiments, network 104 may be the Internet. In some embodiments, network 104 may be a cellular communication network. In some embodiments, network 104 may be some combination of an Internet and a cellular communication network.

System 100 may include a digital content server 106. Digital content server 106 may be a computing device such as personal computer, laptop computer, server, cellular phone, tablet computer, and the like. Digital content server 106 may store digital content, such as one or more webpages that are accessible by a client device 102. For example, client device 102 may load one or more webpages, such as news article webpages that include video content, from digital content server 106. The one or more webpages may be loaded in a browser of client device 102. The video content may be included in a webpage via a video player, for example.

System 100 may include an advertising content server 108. Advertising content server 108 may be a computing device such as personal computer, laptop computer, server, cellular phone, tablet computer, and the like. Advertising content server 108 may include digital advertising content, such as video advertising content, static digital advertising content, and audio advertising content, for example. The digital advertising content may be provided to advertising content server 108 from one or more advertising sources and/or advertising crawlers, for example. Advertising content server 108 may receive one or more advertisement requests to populate advertising slots in digital content of digital content server 106. For example, digital content server 106 may provide one or more webpages having one or more advertising slots to a client device 102. Advertising content may be requested from advertising content server 108 such that the one or more advertising slots may be populated with the advertising content.

System 100 may include a dynamic advertising controller 110. Dynamic advertising controller 110 may be a computing device such as personal computer, laptop computer, server, cellular phone, tablet computer, and the like. Dynamic advertising controller 110 may determine advertising content to be served from advertising content server 108 to one or more client devices 102. For example, dynamic advertising controller 110 may determine advertising content to be served to one or more client devices 102 using data provided from the one or more client devices 102. The data may include, for example, demographic data, web history data, web shopping history, and the like. For example, dynamic advertising controller may include one or more of the systems described in co-pending application Ser. No. 15/587,814, entitled "Techniques for Prediction of Popularity of Media," which is hereby incorporated by reference in its entirety.

System 100 may include a dynamic advertising device 112. Dynamic advertising device 112 may be a computing device such as personal computer, laptop computer, server, cellular phone, tablet computer, and the like. Dynamic advertising device 112 may execute software such that digital content provided to one or more client devices 102 from digital content server 106 is compatible with dynamic digital advertising in accordance with embodiments of the present disclosure. For example, the digital content may be one or more webpages that include one or more advertising slots. Dynamic advertising device 112 may configure the one or more advertising slots for dynamic digital advertising. Advertising content from advertising server 108 may be served to fill the one or more advertising slots configured for dynamic digital advertising. Alternatively, or in addition, dynamic advertising device 112 may configure advertising content from advertising content server 108 for dynamic digital advertising. Advertising content configured for dynamic digital advertising may be served to fill the one or more advertising slots. Alternatively, or in addition, dynamic advertising device 112 may configure content provided from digital content server 106 for dynamic advertising. For example, dynamic advertising device 112 may configure a video player associated with content from digital content server 106, or video content itself from digital content server 106. The video content may be associated with a webpage provided by digital content server 106, for example.

For example, the webpages may be news article webpages having one or more advertising slots. The one or more advertising slots may be located in various locations of the webpages. For example, the one or more advertising slots may include banner slots for advertising content banners located at the top of a webpage or down one or more sides of the webpage. For example, an advertising slot may be incorporated with video of a webpage. The video may be located in a video player of the webpage. For example, the advertising slot may be provided pre-roll to video content of a webpage such that advertising content of the slot is displayed before the video content plays. For example, one or more advertising slots may be provided mid-roll to video content, such that advertising content of the one or more slots is displayed at one or more timepoints partway through playback of the video content. For example, one or more advertising slots may be provided post-roll to video content, such that advertising content of the one or more slots is displayed after completion of playback of the video content.

It should be noted that elements 102-112 may be combinable into single elements. For example, dynamic advertising device 112 may be combined with dynamic advertising controller 110. For example, the digital content server 106 and advertising content server 108 may be a single server. Moreover, it should be noted that any one of client device 102, digital content server 106, advertising content server 108, dynamic advertising controller 110, and/or dynamic advertising device 112 may perform the processes and functions described in this disclosure.

Figure 2:
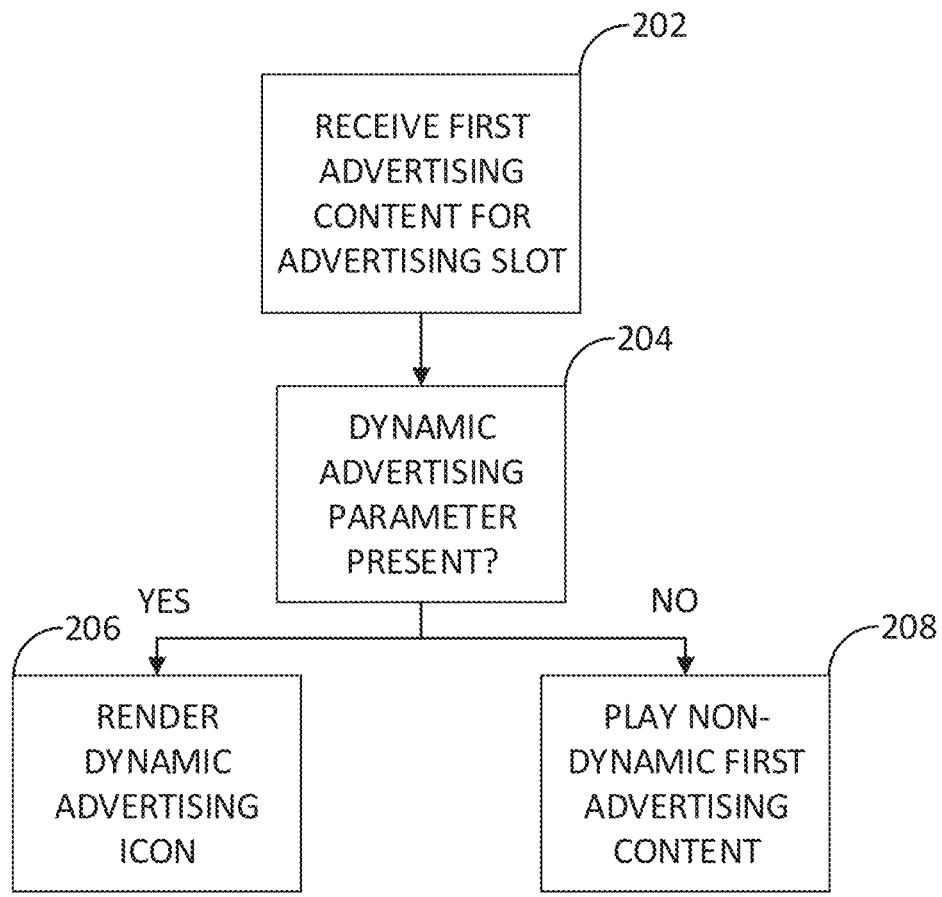
FIG. 2 shows an exemplary dynamic digital advertising content process in accordance with embodiments of the present disclosure.

FIG. 2 shows an exemplary dynamic digital advertising content process 200 according to embodiments of the present disclosure. Process 200 may include a first step 202 where a webpage, displayed on a device such as a client device 102, having one or more advertising slots, may receive first advertising content for a first advertising slot. The first advertising slot may be an advertising slot incorporated with video of a webpage. For example, the first advertising slot may be located in a video player of the webpage. For example, the first advertising slot may be configured to play an advertisement before video content playback. In another example, the first advertising slot may be located at a location of the webpage that is not associated with video content or a video player. The advertising content may be advertising content received from advertising content server 108.

In step 204, a determination may be made as to whether a dynamic advertising parameter is present in the advertising content received in step 202 and/or the first advertising slot. The determination may be made by a video player of the webpage and/or one or more of the client device 102, digital content server 106, advertising content server 108, dynamic advertising controller 110, and/or dynamic advertising device 112.

For example, dynamic advertising device 112 may configure the advertising content and/or first advertising slot and/or video player of the webpage for dynamic digital advertising. The dynamic advertising parameter may be a data bit and/or a flag that reflects whether dynamic advertising is possible. If the dynamic advertising parameter is present in the advertising content and/or first advertising slot and/or video player, process 200 moves to step 206. If no dynamic advertising parameter is present, then process 200 moves to step 208.

In step 206, a dynamic advertising icon may be rendered with respect to the advertising content. In one example, the icon may be rendered by a video player of the webpage configured to play the advertising content. In one example, the dynamic advertising icon may be rendered by a graphical user interface associated with the first advertising slot. In one example, the webpage itself may render the icon. For example, the icon may be a button, a selectable menu item, or the like. A user may interact with the advertising icon by, for example, clicking, touching, or otherwise selecting it. The interaction may signal that the advertising content will be dynamically displayed for the user. For example, after the interaction, playback of the first advertising content may pause, and video content of the webpage may begin playing instead. Playback of the first advertising content may later resume as will be described. The dynamic advertising icon may be rendered before, during, or after playback of the video content. For example, the dynamic advertising icon may be rendered at a predetermined time point. For example, the dynamic advertising icon may be rendered after 5, 10, or 15 seconds of first advertising content playback.

Process 200 proceeds to step 208 when the dynamic advertising parameter is not present (step 204). In step 208, the first advertising content is played without dynamic advertising content functionality. For example, in order for a user to view the video content of the webpage, the user may have to view the entire first advertising content to completion or until a particular time point when advertising content playback terminates. In another example, the first advertising content may play at one or more timepoints within the video content. In another example, the first advertising content may play once the video content has been viewed to completion.

Figure 3:
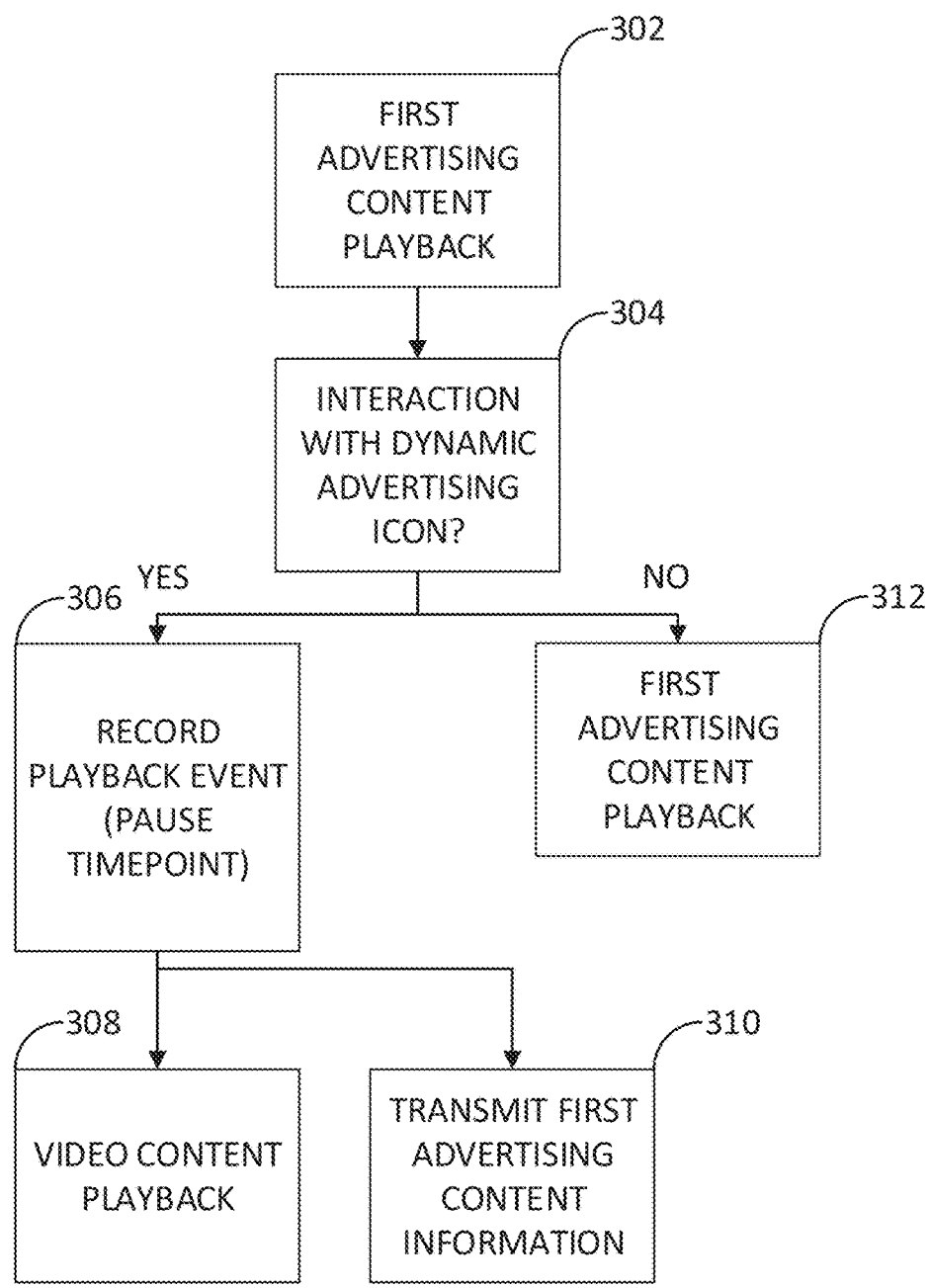
FIG. 3 shows an exemplary dynamic digital advertising content process where a dynamic advertising icon has been rendered in accordance with embodiments of the present disclosure.

FIG. 3 shows an exemplary dynamic digital advertising content process 300 where a dynamic advertising icon has been rendered for the first advertising content as discussed with reference to FIG. 2. Process 300 may include a first step 302, where first advertising content may begin playback in an advertising slot. As noted in FIG. 2, the dynamic advertising icon may be rendered before, during, or after the playback of the first advertising content.

At step 304, a determination may be made as to whether an interaction with the dynamic advertising icon has occurred. For example, one or more of client device 102, digital content server 106, advertising content server 108, dynamic advertising controller 110, and/or dynamic advertising device 112 may determine whether a viewer has clicked, touched, or otherwise selected the dynamic advertising icon. In some embodiments, a determination may be made as to whether an interaction has occurred with the dynamic advertising icon within a predetermined amount of time from when first advertising content playback begins. If an interaction with the dynamic advertising icon is detected, process 300 proceeds to step 306.

At step 306, the interaction may be recorded as a playback event and a timepoint associated with the playback event may be recorded as timepoint data. For example, the timepoint may be the time of first advertising content playback at which the interaction occurred. The timepoint may be recorded as a pause timepoint for the first advertising content. The pause timepoint may reflect the time at which the first advertising content was paused due to the interaction with the dynamic advertising icon.

At step 308, video content playback may begin. For example, the video content may play within a player of the webpage. For example, the video content may play without a player, but associated with the webpage. The video content may play at the same or substantially the same location of the webpage as the first advertisement slot where the first advertising content played. Before, during, or at substantially the same time as video content playback begins in step 308, first advertising content information may be transmitted in step 310 to dynamic advertising device 112. For example, the first advertising content information may indicate the playback event, timepoint (e.g., pause timepoint), and identification data of the first advertising content. The first advertising content information may include one or more key values associated with the first advertising content. The first advertising content information may indicate an advertising slot location on the webpage of the slot where the first advertising content was playing. Dynamic advertising device 112 may use the first advertising content information to update a status and/or one or more attribute values associated with the first advertising content. For example, the pause timepoint of the first advertising content may be updated such that future playback of the first advertising content is configured to start at the pause timepoint. An advertising slot location may also be updated for the first advertising content such that a last advertising slot location is remembered for the first advertising content.

If there has not been an interaction with the dynamic advertising icon, then process 300 proceeds to step 312 from step 304. At step 312, the first advertising content may playback. The playback may be to completion of the first advertising content, or to a predetermined timepoint.

Figure 4:
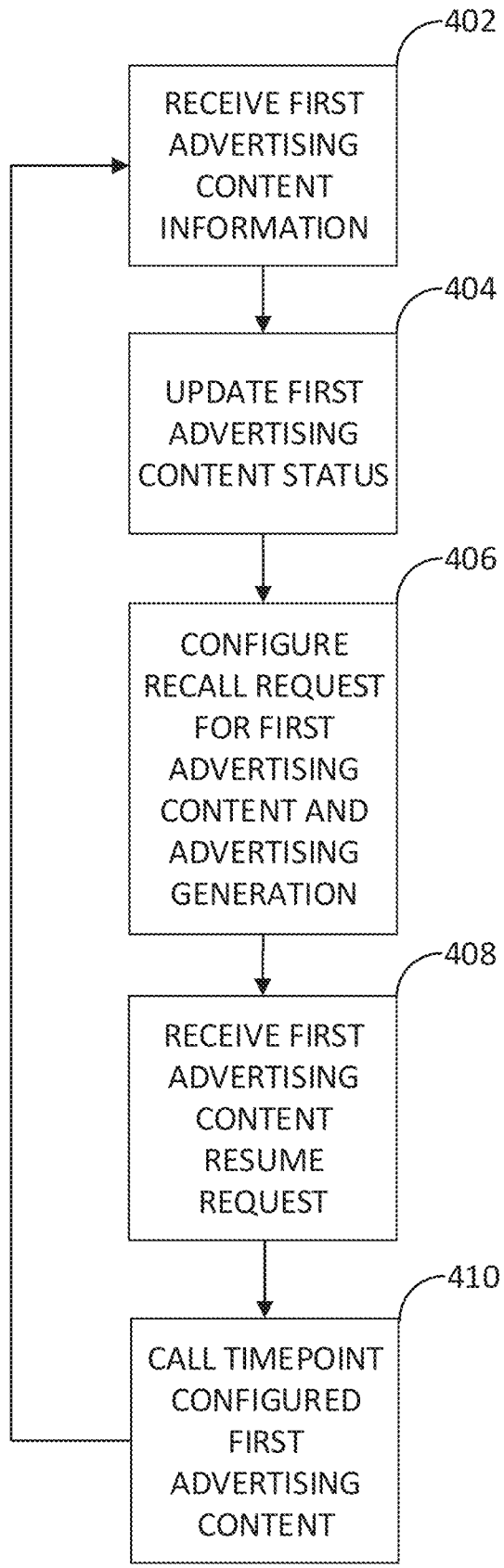
FIG. 4 shows an exemplary dynamic digital advertising content process of data regarding advertising content may be received in accordance with embodiments of the present disclosure.

FIG. 4 shows an exemplary dynamic digital advertising content process 400 of how dynamic advertising device 112 may receive data regarding advertising content. For example, in step 402, dynamic advertising device 112 may receive the transmitted first advertising content information from step 310 of FIG. 3. As discussed, the first advertising content information may indicate the playback event, timepoint (e.g., pause timepoint), an identification of the first advertising content, and/or a key value associated with the first advertising content. In step 404, dynamic advertising device 112 may update a status and/or one or more attribute values associated with the first advertising content. For example, the pause timepoint of the first advertising content may be updated such that future playback of the first advertising content is configured to start at the timepoint. For example, once video content playback in step 308 of FIG. 3 has occurred for a predetermined time, or once video content playback in step 308 of FIG. 3 has occurred until competition of the playback, the first advertising content may be sent to the client device 102 for playback starting at the pause timepoint. For example, the first advertising content may be sent to the first advertising slot. For example, the first advertising content may be sent to an advertising slot that is different to the first advertising slot.

At step 406, the dynamic advertising device 112 may configure a recall request for the first advertising content. For example, the dynamic advertising device 112 may configure the recall request such that when the first advertising content is recalled from advertising content server 108, it is configured for playback starting at a certain timepoint, such as the pause timepoint or a playback event timepoint, which will be discussed with respect to FIG. 5. Dynamic advertising device 112 may identify the first advertising content in the recall request using its identification data and/or one or more key values associated with the first advertising content. Dynamic advertising device 112 may then specify the pause timepoint as the starting timepoint for subsequent playback of the identified first advertising content within the recall request. Dynamic advertising device 112 may configure future advertising generation with respect to the webpage. For example, dynamic advertising device 112 may disable advertisement content serving or advertisement content refresh for a predetermined time period or until playback of the first advertising content has been performed until competition. This disabling may disable serving of advertising content different from the first advertising content to the advertising slot for the first advertising content, or may disable refresh of an advertisement slot for the first advertising content. After the predetermined time period, or after playback of the first advertising content has been performed until completion, dynamic advertising device 112 may un-disable advertisement content serving or un-disable advertising content refresh. After un-disabling, second advertising content may be served to the advertising slot for the first advertising content, or the advertising slot for the first advertising content may be refreshed with second advertising content.

When a subsequent request is received for the resumption of playback of the first advertising content on the webpage, dynamic advertising device 112 may provide or request the first advertising content from advertising content server 108 using the recall request sent to one or more of advertising content server 108 and/or dynamic advertising controller 110. The first advertising content may then be served from the advertising content server 108 to the webpage of the client device 102 and may start playback from the pause timepoint. Steps 408 and 410 describe this process, and will be explained at a later point.

As noted in FIG. 3, at step 308, video content playback may occur. For example, the video content playback may play until a video content playback end timepoint. The playback end timepoint may be a timepoint at the competition of the video content. In another example, the playback end timepoint may be a certain timepoint when a viewer pauses or stops the video content playback, or where the video content playback is preconfigured to pause or stop.

Figure 5:
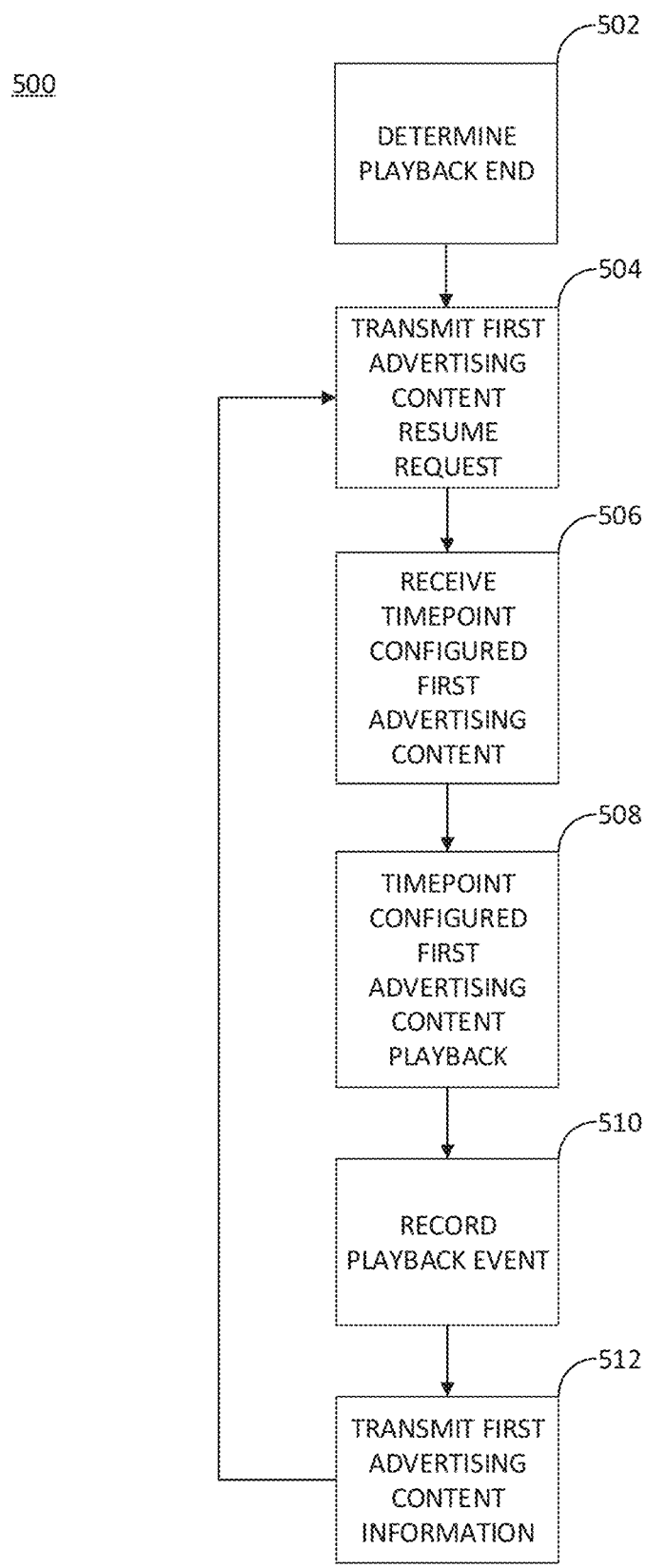
FIG. 5 shows an exemplary dynamic digital advertising content process of how resumption of the first advertising content playback occurs in accordance with embodiments of the present disclosure.

FIG. 5 shows an exemplary dynamic digital advertising content process 500 of how resumption of the first advertising content playback occurs. At step 502, playback end is determined. This step determines that the video content playback has proceeded to the playback end timepoint. As noted, the playback end timepoint may be the time at completion of the video content, or another timepoint where video content playback is paused or stopped.

At step 504, a first advertising content resume request is transmitted to the dynamic advertising device 112. The resume request indicates that the first advertising content should be resent to the webpage having the video content. The first advertising content may be identified using identification data within the request. The advertising slot of the webpage which should receive the resuming first advertising content may also be specified within the request. The resume request may cause the dynamic advertising device 112 to provide the first advertising content from advertising content server 108 and/or use direct dynamic advertising controller 110 to request the first advertising content from advertising content server 108, using the recall request as will be discussed with reference to FIG. 4.

At step 506, the timepoint-configured first advertising content may be served to the webpage at the specified advertising slot from advertising content server 108, and at step 508, the timepoint-configured first advertising content may resume playback from the pause timepoint. For example, the playback of the timepoint-configured first advertising content may resume playback in an advertising slot where the video content was located. In another example, the playback of the timepoint-configured first advertising content may resume playback in an advertising slot located in a different location to the video content. For example, the playback of the timepoint-configured first advertising content may resume in an advertising slot within a window view of the webpage browser. As the webpage is scrolled or otherwise moved, the playback of the timepoint-configured first advertising content may resume within one or more advertising slots that are present within the viewable window.

At step 510, a playback event may be recorded when the timepoint-configured first adverting content is playing in an advertising slot, but the slot is scrolled or otherwise navigated away from. This may occur, for example, when a viewer is scrolling on the webpage. The viewer's view of the webpage may include the advertising slot playing the timepoint-configured first adverting content. However, the viewer may scroll or navigate on the webpage such that the advertising slot is no longer viewable. In this case, playback of the timepoint-configured first adverting content may be paused again because the advertising content is not viewable. The timepoint at which the playback event occurs (and thereby, when the timepoint-configured first adverting content was not viewable), may be recorded as a playback event timepoint. For example, the playback event may occur when all or part of the advertising slot displaying the timepoint-configured first adverting content is no longer viewable.

At step 512, the first advertising content information is transmitted to dynamic advertising device 112. For example, the first advertising content information may indicate the playback event of step 510, timepoint (e.g., playback event timepoint), and identification data of the first advertising content. The first advertising content information may include one or more key values associated with the first advertising content. The first advertising content information may be used by dynamic advertising device 112 to update a status and/or one or more attribute values associated with the first advertising content. For example, the playback event timepoint of the first advertising content may be updated such that future playback of the first advertising content is configured to start at the playback event timepoint. The location of the last advertising slot paying the first advertising content may also be updated.

The process 500 returns to step 504 when a viewer of the webpage navigates the webpage to a view where all or part of one or more advertising slots are viewable. When this occurs, a first advertising content resume request is transmitted to the dynamic advertising device 112. The resume request indicates that the first advertising content should be resent to the webpage, and in particular, to one or more advertising slots of the webpage that are viewable. The resume request may cause the dynamic advertising device 112 to provide the first advertising content from advertising content server 108 and/or request dynamic advertising controller 112 call the first advertising content from advertising content server 108 using the recall request as discussed with reference to FIG. 4, but with the playback event timepoint specified as the timepoint for when the advertising content should begin playback in the one or more advertising slots that are viewable. Process 500 steps 504-512 may continue as a viewer scrolls and/or navigates a webpage until a first advertising content has been played to completion or to a predetermined end timepoint of the first advertising content.

Turning back to FIG. 4, steps 408 and 410 describe how dynamic advertising device 112 handles the content resume request of step 504 discussed with respect to FIG. 5. For example, in step 408, dynamic advertising device 112 may receive the first advertising content resume request and determine that a view change of the webpage occurred. For example, dynamic advertising device 112 may determine that a view window of the webpage does not contain the first advertising slot. Dynamic advertising controller may recognize identification data of the request and correlate the identification data to the first advertising content. In step 410, the dynamic advertising device 112 may call timepoint-configured first advertising content or request from dynamic advertising controller 112 that timepoint-configured first advertising content is called so that it is served to the webpage. The timepoint-configured first advertising content may be served to the webpage from advertising content server 108. For example, the playback of the timepoint-configured first advertising content may resume playback in an advertising slot of the webpage where the video content was located, such as the first advertising slot. In another example, the playback of the timepoint-configured first advertising content may resume playback in a different advertising slot of the webpage located in a different location to where the video content played. For example, the playback of the timepoint-configured first advertising content may resume in an advertising slot within a window view of the webpage browser. As the webpage is scrolled or otherwise moved, the playback of the timepoint-configured first advertising content may resume within one or more advertising slots that are present within the viewable window.

The process 400 may move from step 410 back to step 402 if a playback event occurs that is associated with the first advertising content. For example, if the viewer of the webpage navigates the webpage to a view where all or part of one or more advertising slots are no longer viewable, a playback event may be triggered and first advertising content information may be transmitted to and received by dynamic advertising device 112 (e.g., steps 306, 310, and 402).

Figure 6:
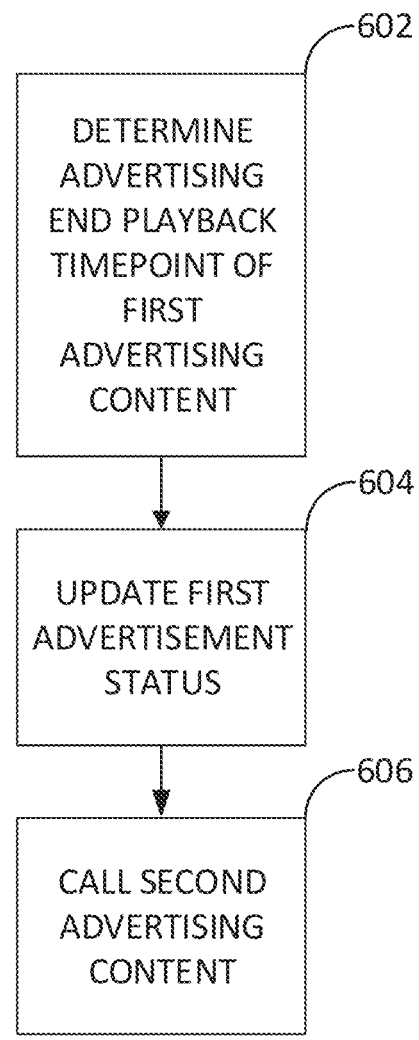
FIG. 6 is an exemplary process for determining when second advertising content should be called in accordance with embodiments of the present disclosure.

FIG. 6 is an exemplary process 600 for determining when second advertising content should be called. For example, at step 602, a determination may be made as to whether an end playback timepoint of the first advertising content has been reached. For example, this timepoint may be a timepoint at the end of the first advertising content that is reached when the first advertising content has been played to completion, or may be a predetermined timepoint that is a different time. At step 604, an advertisement status for the first advertising content may be updated such that the status indicates viewing of first advertisement content should be terminated and a second advertising content should be served. For example, an advertisement refresh may be enabled such that other advertising content, such as the second advertising content, may be served to the webpage. At step 606, the second advertising content may be served to the webpage in one or more advertising slots.

Figure 7:
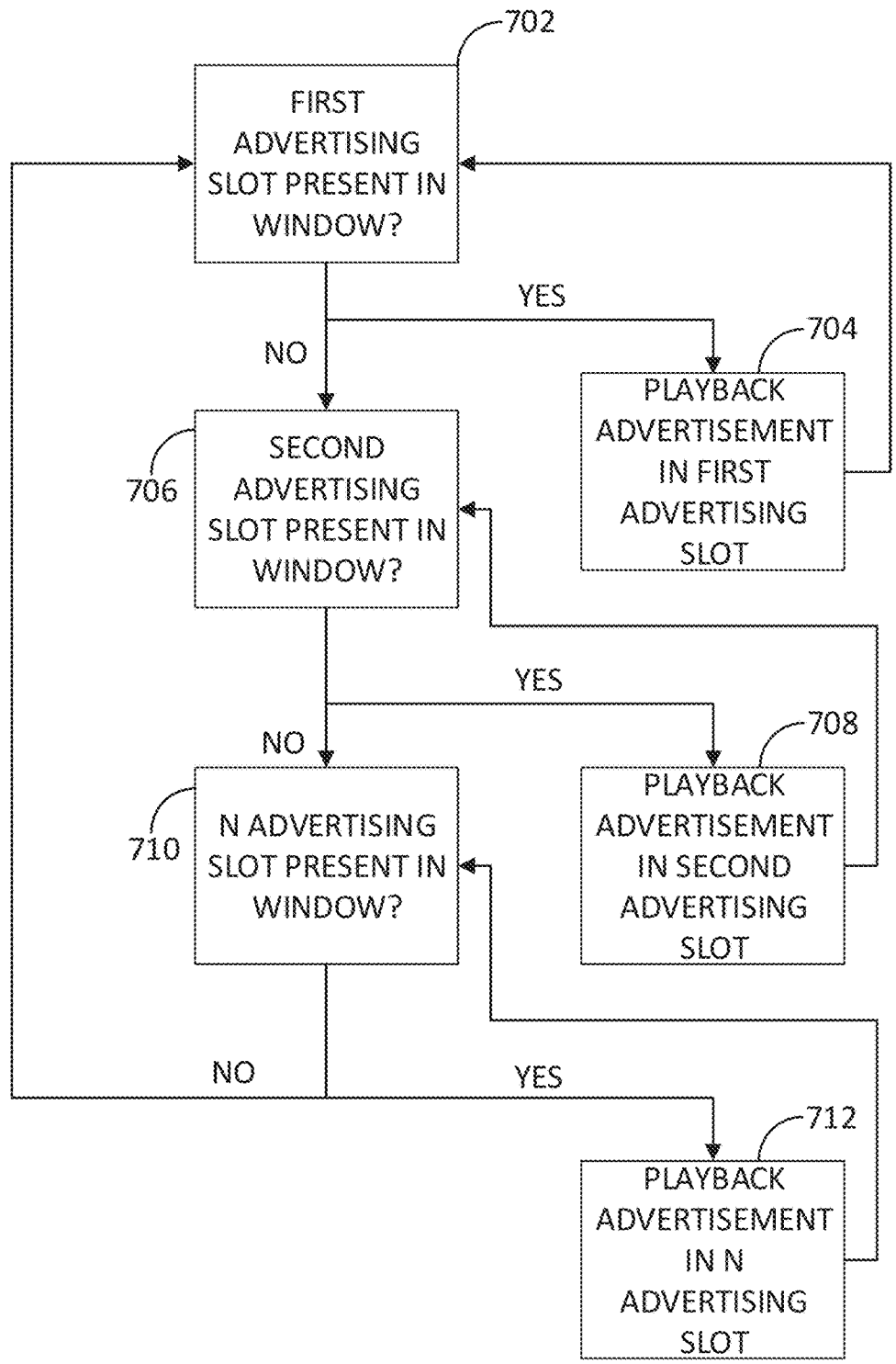
FIG. 7 shows an exemplary process for determining whether a playback event has occurred in accordance with embodiments of the present disclosure.

FIG. 7 shows an exemplary process 700 for determining whether a playback event has occurred, as discussed with respect to FIG. 5, when a viewer of a webpage navigates a webpage to different viewpoints. For example, in step 702, a determination may be made as to whether a first advertising slot of a webpage is present in a web browser window and thereby viewable by a viewer. If the first advertising slot is present in the window, then the process moves to step 704. In step 704, advertisement content may be played in the first advertising slot. Process 700 may move back to step 702 to determine if the first advertising slot is still present within the window and viewable to a viewer.

In step 702, if the first advertising slot is not present in the window and thereby not viewable, then the process moves to step 706, where a determination may be made as to whether a second advertising slot of the webpage is present in the web browser window and thereby viewable by a viewer. The second advertising slot may be located in a different part of the webpage to the first advertising slot. For example, the second advertising slot may be located in a part of the webpage where the viewer must scroll to or otherwise navigate to from the webpage part having the first advertising slot. If the second advertising slot is present in the web browser window and thereby viewable by a viewer, the advertisement content may be played in the second advertising slot. Process 700 may move back to step 706 to determine if the second advertising slot is still present within the window and viewable to a viewer. The advertisement content may play in the second advertising slot from a timepoint at which viewing from the first advertisement slot ceased. This may ensure that all or substantially all of the advertisement content is viewed by a viewer of the webpage.

In step 706, if the second advertising slot is not present in the window and thereby viewable, then the process moves to step 710, where process 700 may continue for N number of advertising slots that may be present in the webpage. In step 710, a determination may be made as to whether N number advertising slot of the webpage is present in the web browser window and thereby viewable by a viewer, and if the N number advertising slot is present, playback of the advertisement in this slot may occur. If the advertising slot is not present in step 710, process 700 may return to step 702 and a first advertising slot may be searched for.

Figure 8A:
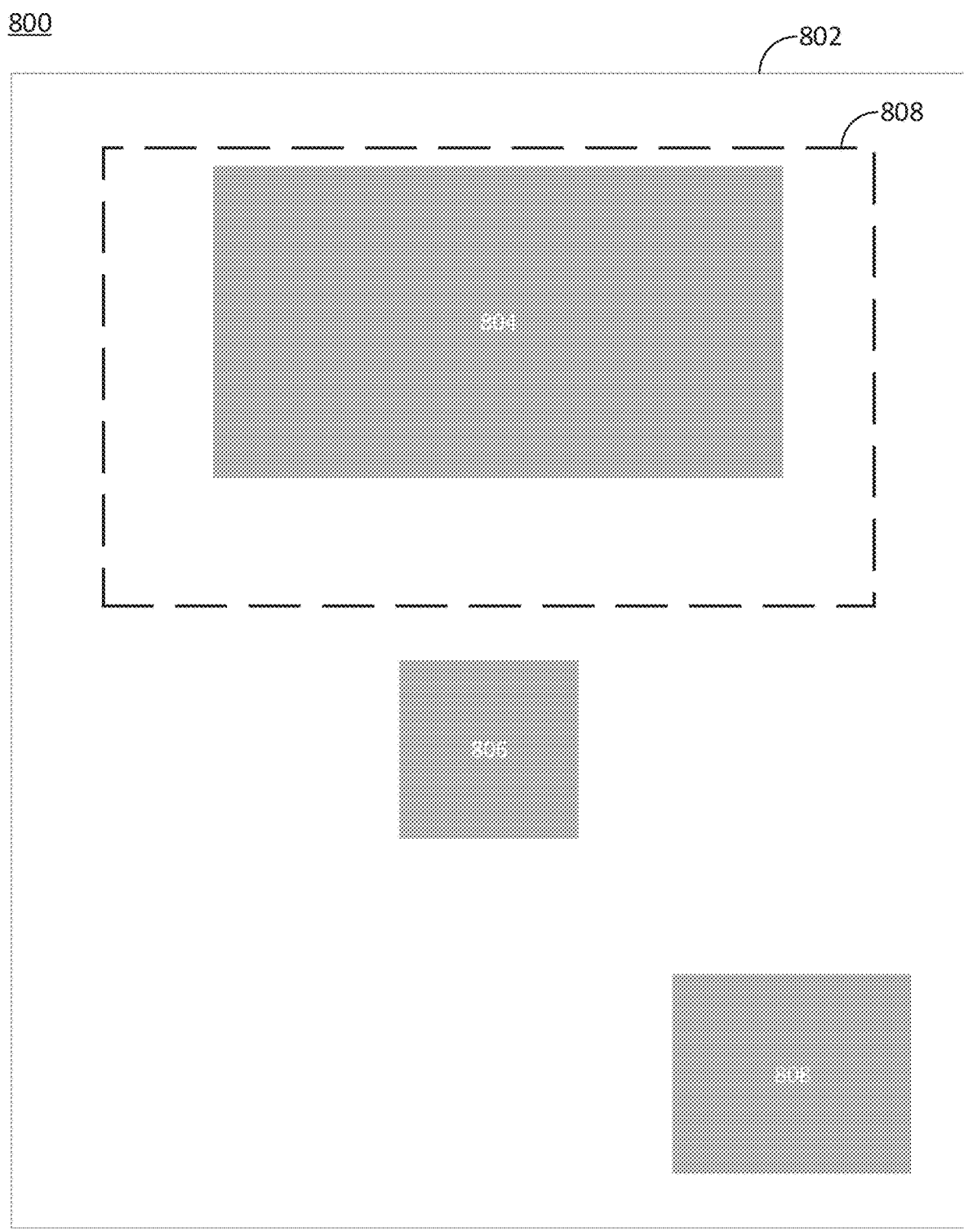
FIGS. 8A-8C show an exemplary webpage in accordance with embodiments of the present disclosure.
Figure 8B:
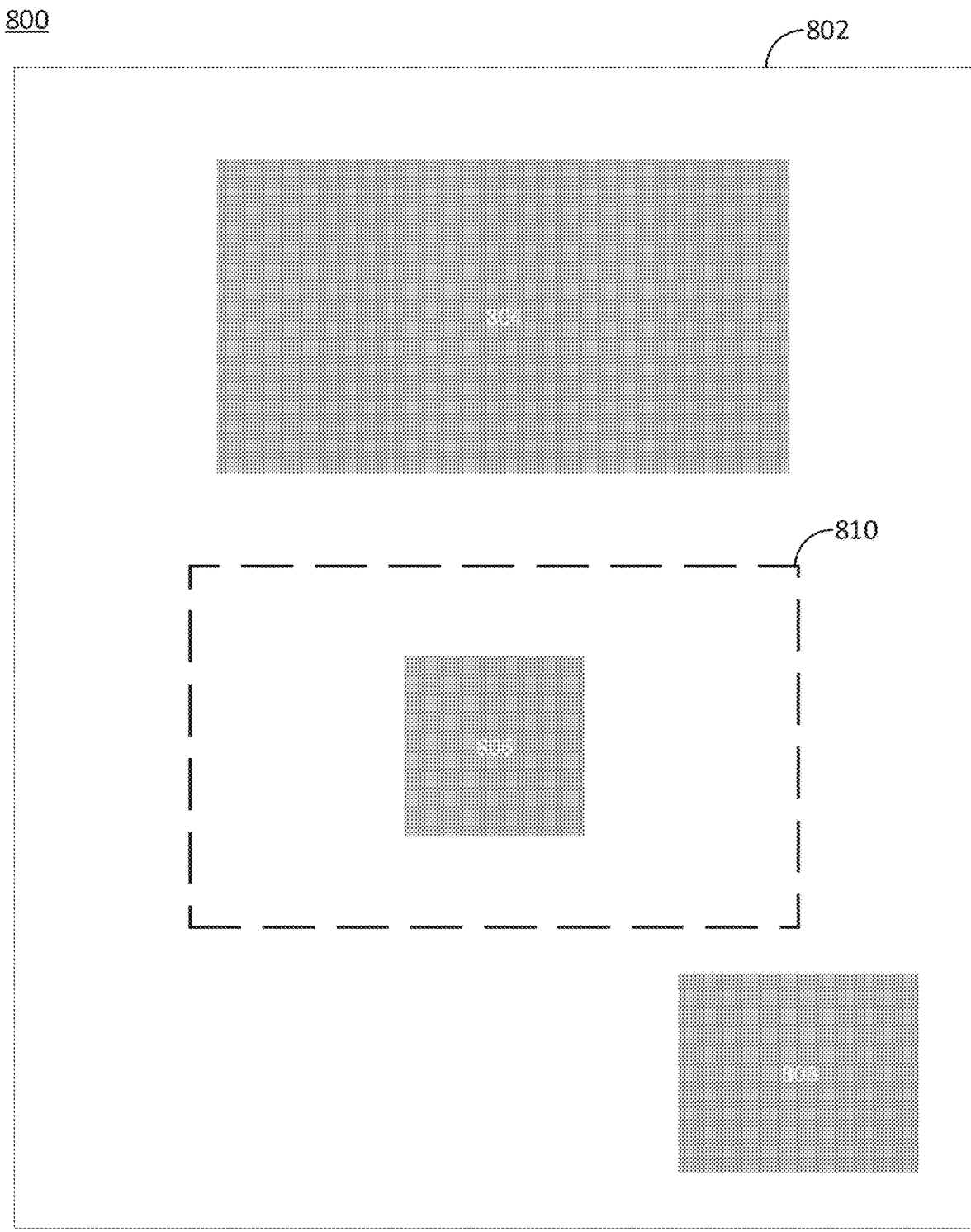
Figure 8C:
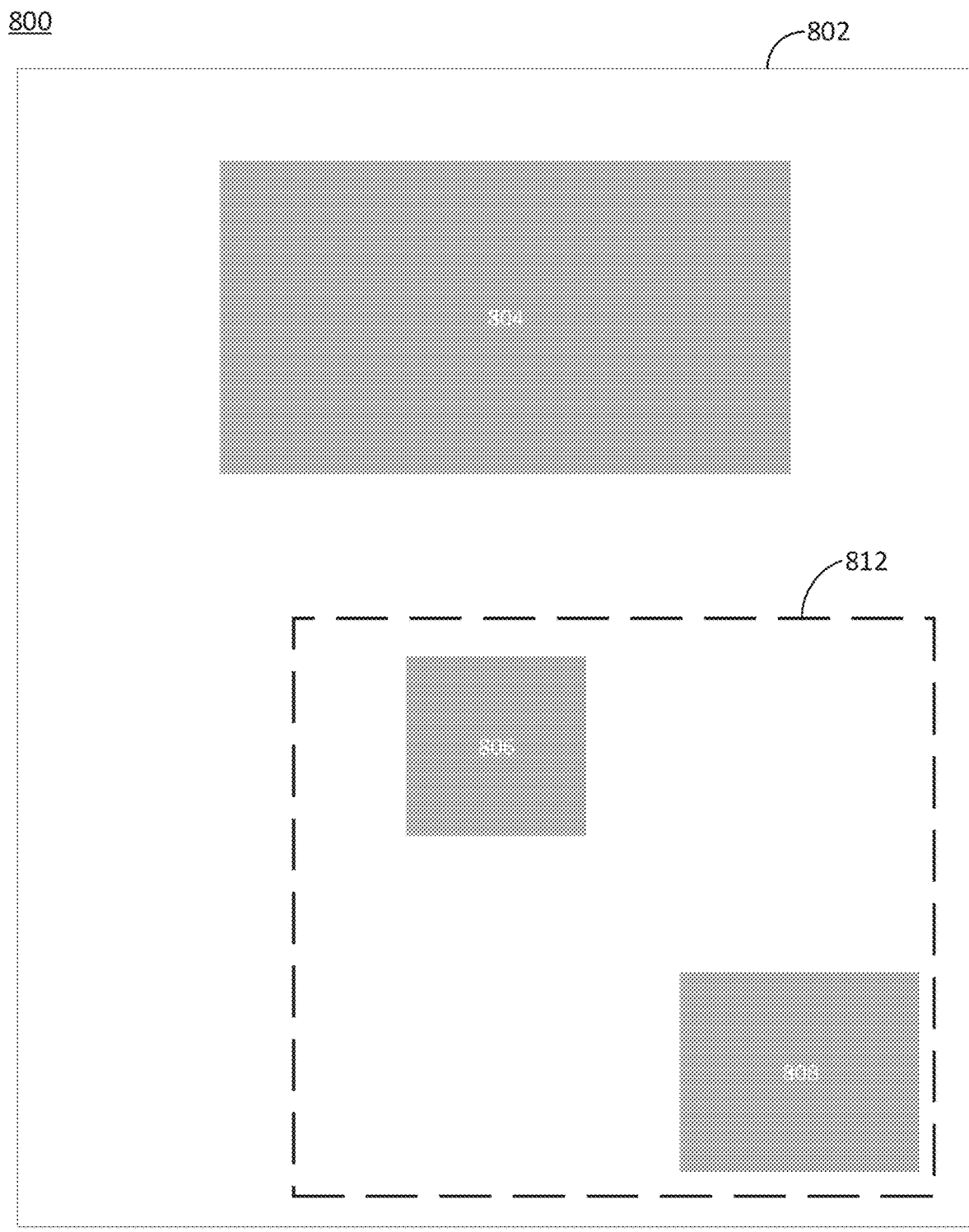

FIGS. 8A-8C show diagram 800 of an exemplary webpage 802 in accordance with embodiments of the present disclosure. For example, as shown by FIG. 8A, webpage 802 may include advertising slots 804, 806, and 808. Advertising slots 804, 806, and 808 may be located in different locations of webpage 802. Advertising slots 804, 806, and 808 may be configured to show video or static advertising content provided by advertising content server 108. Advertising slots 804, 806, and 808 may be sized in various manners. For example, slots 804, 806, and 808 may be the same, substantially the same, or different in size. For example, one or more of slots 804, 806, and 808 may be larger than the one or more of the others. One or more of advertising slots 804, 806, and 808 may be located where a video player of webpage 802 is located, or may overlay the video player, video content, or any other content of webpage 802. Webpage 802 may, for example, be a news article webpage, and advertising slots 804, 806, and 808 may be located at different locations throughout the article webpage. For example, one or more of advertising slots 804, 806, and 808 may be located in or overlay a video player of webpage 802. For example, one or more of advertising slots 804, 806, and 808 may be located outside of a video player or video content of webpage 802.

As shown by FIG. 8A, a first view window 808 may view part of webpage 802. First view window 808 reflects the view for a user viewing webpage 802, where the only advertising slot present in the view is slot 804. In such a case, advertising content may only be observed by the user via slot 804. A user may interact with a dynamic advertising icon that may be rendered (as discussed with respect to FIG. 2) and associated with advertising slot 804 and/or the advertising content shown in advertising slot 804, and video content may play instead of advertising content of slot 804. However, after a playback end timepoint of the video content, the advertising content may resume playback in one of advertising slots 804, 806, and 808 depending on where a view window is. With respect to FIG. 8A, the advertising content would resume playback in advertising slot 804 because this slot is the only one observable by view window 808.

As shown by FIG. 8B, a user may navigate on webpage 802 to a new view showing a different location of the webpage, such as view window 810. View window 810 may not include advertising slot 804. However, view window 810 may include advertising slot 806. After a user navigates on webpage 802 from view window 808 to view window 810, the advertising content that was playing in advertising slot 804 may resume playing in advertising slot 806 of view 810. For example, the advertising content that was playing in advertising slot 804 may be recalled by dynamic advertising dynamic advertising device 112 and/or requested for recall by dynamic advertising dynamic advertising device 112, and served to advertising slot 806.

As shown by FIG. 8C, a user may navigate on webpage 802 to a new view showing a different location of the webpage, such as view window 812. View window 812 may not include advertising slot 804, but may include both advertising slots 806 and 808. The advertising content that was playing in advertising slot 806 may continue playing in slot 806 without change. Slot 808 may include the same or different advertising content. Alternatively, for example, the advertising content that was playing in advertising slot 806 may now play in advertising slot 808, and slot 806 may include the same or different advertising content. In such a case, for example, the advertising content that was playing in advertising slot 806 may be recalled by dynamic advertising dynamic advertising dynamic advertising device 112 and/or requested for recall by dynamic advertising dynamic advertising device 112, and served to advertising slot 808.

Figure 9:
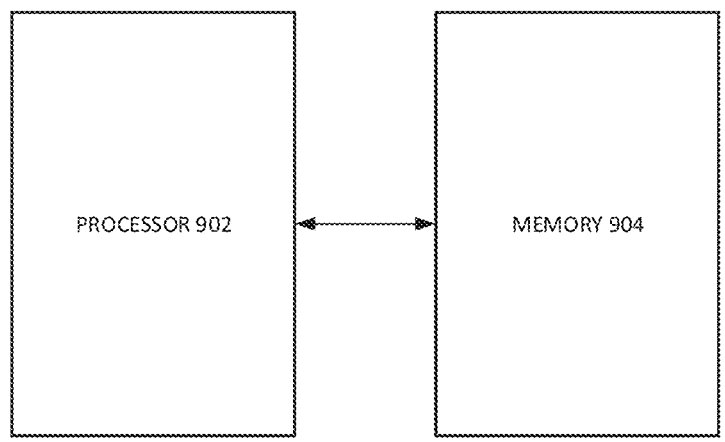
FIG. 9 shows an implementation of hardware in accordance with the present disclosure.

FIG. 9 shows an implementation of hardware 900 in accordance with the present disclosure. For example, computer devices (e.g., client device(s) 102, digital content server 106, advertising content server 108, dynamic advertising controller 110, and dynamic advertising device 112) may be implemented by a processor 902 and memory 904. Processor 902 may execute instructions in accordance with embodiments of the present disclosure that are stored in memory 904.

Embodiments of the present disclosure have been described with reference to advertisement slots of a webpage. However, embodiments of the present disclosure are also applicable to advertisement slots of multiple webpages. For example, embodiments of the present disclosure are applicable to switching between first and second webpages of a browser, where each webpage includes one or more advertising slots.

Embodiments of the present disclosure provide for a system, method, computer readable medium (non-transitory) storing instructions thereon for executing a method or software instructions, for determining and/or predicting the popularity of media.

Modifications listed herein and other modifications can be made by those in the art without departing from the ambit of the disclosure. Although the embodiment of the disclosure have been described, the disclosure is not limited to the above embodiments and the specific configurations shown in the drawings. For example, some components shown here can be combined with each other as one embodiment, and/or a component can be divided into several subcomponents, and/or any other known or available component can be added. The operation processes are also not limited to those shown in the examples. Those skilled in the art will appreciate that the embodiments of the disclosure can be implemented in other ways without departing from the substantive features of the disclosure. For example, features and embodiments described here can be combined with and without each other. The present embodiments are therefore to be considered in all respects as illustrative and not restrictive. Other embodiments can be utilized and derived therefrom, such that structural and logical substitutions and changes can be made without departing from the scope of this disclosure. This Specification, therefore, is not to be taken in a limiting sense, along with the full range of equivalents to which such claims are entitled.

This disclosure is intended to cover any and all adaptations and/or variations of various embodiments. Combinations of the above embodiments, and other embodiments not specifically described herein, will be apparent to those of ordinary skill in the art upon reviewing this description.

The invention claimed is:

1. A dynamic advertising method comprising:
    receiving, by a computer processor associated with a dynamic advertising device, from a client device and via a network, first advertising content information including timepoint data for a playback event associated with first advertising content of a first advertising slot on a webpage;
    configuring, by the computer processor, a recall request for the first advertising content, the recall request including identification data associated with the first advertising content and specifying a timepoint obtained from the timepoint data;
    receiving, by the computer processor, from the client device and via the network, first advertising content resume request; and
    requesting, by the computer processor, for the client device, using the recall request, timepoint-configured first advertising content having a playback start time equal to the timepoint.

2. The dynamic advertising method of claim 1, wherein the timepoint-configured first advertising content is requested for the first advertising slot of the webpage.

3. The dynamic advertising method of claim 1, wherein the timepoint-configured first advertising content is requested for a second advertising slot of the webpage, the second advertising slot being different from the first advertising slot.

4. The dynamic advertising method of claim 1, further comprising:
    determining, by the computer processor, that a view window of the webpage does not include the first advertising slot; and
    determining, by the computer processor, that the view window of the webpage includes a second advertising slot different from the first advertising slot,
        wherein the timepoint-configured first advertising content is requested for the second advertising slot.

5. The dynamic advertising method of claim 1, further comprising:
    receiving, by the computer processor, from the client device and via the network, updated first advertising content information including second timepoint data including a second timepoint reflecting a second playback event, the second playback event being a determination that a view window of the webpage does not include the first advertising slot.

6. The dynamic advertising method of claim 5, further comprising:
    configuring, by the computer processor, a second recall request for the first advertising content, the second recall request including the identification data associated with the first advertising content and specifying the second timepoint.

7. The dynamic advertising method of claim 6, further comprising:
    requesting, by the computer processor, for the client device, second timepoint-configured first advertising content for a second advertising slot of the webpage, wherein
        the second timepoint-configured first advertising content has a playback start time equal to the second timepoint, and
        the second advertising slot is located in the view window of the webpage that does not include the first advertising slot.

8. The dynamic advertising method of claim 1, further comprising:
    disabling, by the computer processor, serving of second advertising content to the webpage.

9. The dynamic advertising method of claim 8, further comprising:
    determining, by the computer processor, a playback end of the first advertising content;
    updating, by the computer processor, a status associated with the first advertising content; and un-disabling, by the computer processor, serving of the second advertising content to the webpage.

10. The dynamic advertising method of claim 1, wherein the playback event is an interaction with an icon of a user interface associated with the first advertising slot.

11. A dynamic advertising device comprising:
a computer processor; and
a memory storing instructions that, when executed by the computer processor, cause the computer processor to:
receive, from a client device and via a network, first advertising content information including timepoint data for a playback event associated with first advertising content of a first advertising slot on a webpage;
configure a recall request for the first advertising content, the recall request including identification data associated with the first advertising content and specifying a timepoint obtained from the timepoint data;
receive, from the client device and via the network, first advertising content resume request; and
request, for the client device, using the recall request, timepoint-configured first advertising content having a playback start time equal to the timepoint.

12. The dynamic advertising device of claim 11, wherein the instructions cause the computer processor to request the timepoint-configured first advertising content for the first advertising slot of the webpage.

13. The dynamic advertising device of claim 11, wherein the instructions cause the computer processor to the timepoint-configured first advertising content for a second advertising slot of the webpage, the second advertising slot being different from the first advertising slot.

14. The dynamic advertising device of claim 11, wherein the instructions further cause the computer processor to:
determine that a view window of the webpage does not include the first advertising slot; and
determine that the view window of the webpage includes a second advertising slot different from the first advertising slot,
wherein the instructions cause the computer processor to request the timepoint-configured first advertising content for the second advertising slot.

15. The dynamic advertising device of claim 11, wherein the instructions further cause the computer processor to:
receive, from the client device and via the network, updated first advertising content information including second timepoint data including a second timepoint reflecting a second playback event, the second playback event being a determination that a view window of the webpage does not include the first advertising slot.

16. The dynamic advertising device of claim 15, wherein the instructions further cause the computer processor to:
configure a second recall request for the first advertising content, the second recall request including the identification data associated with the first advertising content and specifying the second timepoint.

17. The dynamic advertising device of claim 16, wherein the instructions further cause the computer processor to:
request, for the client device, second timepoint-configured first advertising content for a second advertising slot of the webpage, wherein
the second timepoint-configured first advertising content has a playback start time equal to the second timepoint, and
the second advertising slot is located in the view window of the webpage that does not include the first advertising slot.

18. The dynamic advertising device of claim 11, wherein the instructions further cause the computer processor to:
disable serving of second advertising content to the webpage.

19. The dynamic advertising device of claim 18, wherein the instructions further cause the computer processor to:
determine a playback end of the first advertising content;
update a status associated with the first advertising content; and
un-disable serving of the second advertising content to the webpage.

20. The dynamic advertising device of claim 11, wherein the playback event is an interaction with an icon of a user interface associated with the first advertising slot.

* * * * *